United States Patent
Chen et al.

(10) Patent No.: US 9,319,982 B2
(45) Date of Patent: Apr. 19, 2016

(54) METHOD, TERMINAL DEVICE, NETWORK-SIDE DEVICE, AND COMMUNICATIONS SYSTEM FOR MANAGING POWER SUPPLY

(71) Applicant: HUAWEI TECHNOLOGIES CO., LTD., Shenzhen (CN)

(72) Inventors: Dong Chen, Shanghai (CN); Yinghong Yang, Shanghai (CN); Jiyong Wang, Shanghai (CN); Zhen Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 14/059,770

(22) Filed: Oct. 22, 2013

(65) Prior Publication Data

US 2014/0051438 A1   Feb. 20, 2014

Related U.S. Application Data

(63) Continuation of application No. PCT/CN2011/073168, filed on Apr. 22, 2011.

(51) Int. Cl.
*H04W 52/02* (2009.01)
*H04W 48/20* (2009.01)

(52) U.S. Cl.
CPC .......... *H04W 52/0212* (2013.01); *H04W 48/20* (2013.01); *H04W 52/0251* (2013.01); *H04W 52/0254* (2013.01); *H04W 52/0261* (2013.01); *Y02B 60/50* (2013.01)

(58) Field of Classification Search
CPC ............ H04W 52/0261; H04W 48/20; H04W 52/0212; H04W 52/0251; H04W 52/0254
USPC ........ 455/434, 574, 452.1; 370/252, 311, 338
See application file for complete search history.

(56) References Cited

U.S. PATENT DOCUMENTS

| 2007/0004376 | A1 |   | 1/2007 | Kogure |         |
|--------------|----|---|--------|--------|---------|
| 2008/0132281 | A1 | * | 6/2008 | Kim et al. | 455/562.1 |

(Continued)

FOREIGN PATENT DOCUMENTS

| CN | 1801669 | 7/2006 |
| CN | 1909694 | 2/2007 |

(Continued)

OTHER PUBLICATIONS

Chinese Office Action issued Jun. 19, 2013 in corresponding Chinese Patent Application No. 201180000350.2.
PCT International Search Report and Written Opinion of the International Searching Authority issued Jan. 19, 2012 in corresponding International Patent Application No. PCT/CN2011/073168.
Chinese Office Action and Search Report dated Nov. 24, 2015 in corresponding Chinese Patent Application No. 201180000350.2.

*Primary Examiner* — Sam Bhattacharya
(74) *Attorney, Agent, or Firm* — Staas & Halsey LLP

(57) ABSTRACT

Embodiments of the present invention provide a method, a terminal device, a network-side device, and a communications system for managing a power supply. The method includes: determining a terminal power consumption level according to remaining power or terminal settings, where the terminal power consumption level is one of at least two power consumption levels. In the embodiments of the present invention, different power consumption levels are applied according to different remaining power of a terminal power supply or terminal settings, thereby adapting to differentiated power consumption requirements and improving the power supply utilization efficiency of a terminal.

7 Claims, 5 Drawing Sheets

---

Receive a cell broadcast message or dedicated signaling that carries information about the cell power consumption level — 401

Select, based on the cell power consumption level, a cell to be camped on — 402

(56) References Cited

U.S. PATENT DOCUMENTS

2010/0161794 A1 6/2010 Horn et al.
2010/0210322 A1 8/2010 Kim et al.
2010/0293402 A1 11/2010 Marinkovic et al.

FOREIGN PATENT DOCUMENTS

| | | |
|---|---|---|
| CN | 1917703 | 2/2007 |
| CN | 101536080 | 9/2009 |
| EP | 2178286 A1 | 4/2010 |

* cited by examiner

METHOD, TERMINAL DEVICE, NETWORK-SIDE DEVICE, AND COMMUNICATIONS SYSTEM FOR MANAGING POWER SUPPLY

CROSS-REFERENCE TO RELATED APPLICATIONS

This application is a continuation of International Application No. PCT/CN2011/073168, filed on Apr. 22, 2011, which is hereby incorporated by reference in the entirety.

TECHNICAL FIELD

Embodiments of the present invention relate to the field of wireless communications, and in particular, to a method, a terminal device, a network-side device, and a communications system for managing a power supply.

BACKGROUND

Operators attach great importance to standby time and talk time of a UE (User Equipment, user equipment) on a network, which serve as an important dimension for evaluating user experience. With evolution of wireless communication technologies in a broadband direction and popularization of smart terminals, a power consumption issue of the UE is increasingly critical.

Power consumption of a UE also varies in different cases. For example, operating power consumption of a UE that supports multiple RATs (Radio Access Technology, radio access technology) varies according to the different RATs due to a difference in device power consumption. In addition, because power consumption of a radio frequency circuit in 2G (the 2nd generation, the 2nd generation) mode is less than that in 3G (the 3rd Generation, the 3rd generation) mode, power consumption of a UE during a call on a 2G network is less than that on a 3G network. Furthermore, in a same RAT, power consumption of a terminal may also vary according to different radio resource allocation policies. For example, a 4.75 kbps voice service is more power-saving than a 12.2 kbps voice service. In addition, some applications on a UE are relatively power-consuming and other applications are relatively power-saving.

Such differences in power consumption cause a decrease in the power supply utilization efficiency of a terminal, shorten standby time of the terminal, and also affect battery life of the terminal.

SUMMARY

Embodiments of the present invention provide a method, a terminal device, a network-side device, and a communications system for managing a power supply, which can improve the power supply utilization efficiency of a terminal.

One aspect provides a method for managing a power supply, including: determining a terminal power consumption level, according to remaining power or terminal settings, where the terminal power consumption level is one of at least two power consumption levels.

Another aspect provides a method for managing a power supply, including: determining a cell power consumption level, where the cell power consumption level is used to indicate power consumption of a terminal in a cell; and sending, to the terminal, a cell broadcast message or dedicated signaling that carries information about the cell power consumption level.

Another aspect provides a method for managing a power supply, including: receiving a cell broadcast message or dedicated signaling that carries information about a cell power consumption level, where the cell power consumption level is used to indicate a power consumption level of a terminal in a cell; and selecting, based on the cell power consumption level, a cell to be camped on.

Another aspect provides a method for managing a power supply, including: receiving a terminal power consumption level reported by a terminal, where the terminal power consumption level is one of at least two power consumption levels of the terminal; and selecting a resource allocation scheme based on the terminal power consumption level.

Another aspect provides a terminal device, including: a parameter determining unit, configured to determine remaining power or terminal settings; and a level determining unit, configured to determine a terminal power consumption level according to the remaining power or terminal settings, where the terminal power consumption level is one of at least two power consumption levels.

Another aspect provides a terminal device, including: a receiving unit, configured to receive a cell broadcast message or dedicated signaling that carries information about a cell power consumption level, where the cell power consumption level is used to indicate a power consumption level of a terminal in a cell; and a selecting unit, configured to select, based on the cell power consumption level, a cell to be camped on.

Another aspect provides a network-side device, including: a level determining unit, configured to determine a cell power consumption level, where the cell power consumption level is used to indicate power consumption of a terminal in a cell; and a message unit, configured to send, to the terminal, a cell broadcast message or dedicated signaling that carries information about the cell power consumption level.

Another aspect provides a network-side device, including: a receiving unit, configured to receive a terminal power consumption level reported by a terminal, where the terminal power consumption level is one of at least two power consumption levels of the terminal; and an allocating unit, configured to select a resource allocation scheme based on the terminal power consumption level.

Another aspect provides a communications system, including anyone of the foregoing terminal devices or network-side devices.

In the embodiments of the present invention, different power consumption levels are applied according to different remaining power of a terminal power supply or terminal settings, thereby adapting to differentiated power consumption requirements and improving the power supply utilization efficiency of the terminal.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may apply to various communications systems, such as a GSM system, a Code Division Multiple Access (Code Division Multiple Access, CDMA) system, a Wideband Code Division Multiple Access Wireless (Wideband Code Division Multiple Access Wireless, WCDMA) system, a General Packet Radio Service (GPRS, General Packet Radio Service) system, and a Long Term Evolution (LTE, Long Term Evolution) system.

A mobile terminal (Mobile Terminal), also called a user equipment (User Equipment, UE), a mobile user equipment, or the like, may communicate with one or more core networks through a radio access network (such as an RAN, Radio Access Network). The mobile terminal may be a mobile device, such as a mobile phone (or called a "cellular" phone) or a computer equipped with a mobile terminal. For example, the mobile terminal may be a portable, pocket-sized, handheld, computer-embedded, or vehicle-mounted mobile apparatus, which exchanges a language and/or data with the radio access network.

A base station may be a base transceiver station (Base Transceiver Station, BTS) in GSM or CDMA, or a NodeB (NodeB) in WCDMA, or an evolutional NodeB (evolutional NodeB, eNB or eNodeB) in LTE, and this is not limited in the present invention.

A base station controller may be a base station controller (Base Station Controller, BSC) in GSM or CDMA, or a radio network controller (Radio Network Controller, RNC) in WCDMA, and this is not limited in the present invention.

Figure 1:
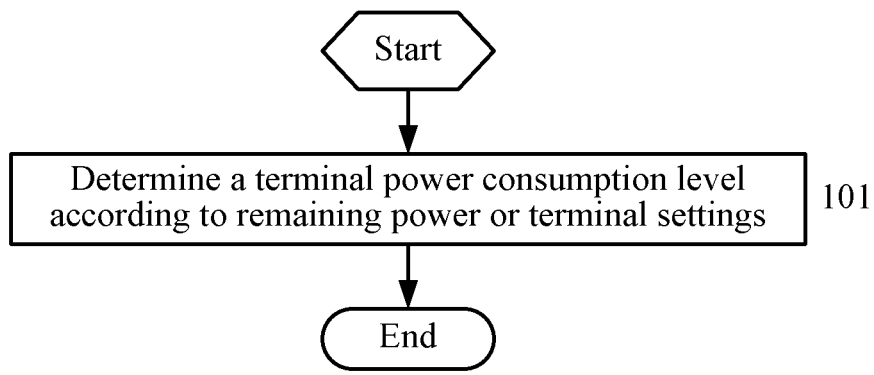
FIG. 1 is a schematic flowchart of a method for managing a power supply according to an embodiment of the present invention.

FIG. 1 is a schematic flowchart of a method for managing a power supply according to an embodiment of the present invention. The method shown in FIG. 1 may be executed by a terminal device (such as a UE).

In step 101, a terminal power consumption level is determined according to remaining power or terminal settings, where the terminal power consumption level is one of at least two power consumption levels.

Therefore, in this embodiment of the present invention, different power consumption levels are applied according to different remaining power of a terminal power supply or terminal settings, thereby adapting to differentiated power consumption requirements and improving the power supply utilization efficiency of the terminal.

In this embodiment of the present invention, the terminal power consumption level represents a level of a power saving requirement of a terminal. For example, a higher level may indicate a higher priority of a power saving requirement. The terminal power consumption level may include two levels: "Power saving" and "No power saving"; and may also be expanded to more power saving modes, such as "No power saving", "General power saving", and "Power saving preferred"; or is classified by power consumption mode into high performance (high power consumption), balanced power consumption (medium power consumption), high power saving (low power consumption), or the like.

The examples given here for the power consumption level shall not be construed as a limitation on the scope of this embodiment of the present invention. In the scope of this embodiment of the present invention, a more refined level may be used or another level mode may be used.

Figure 2:
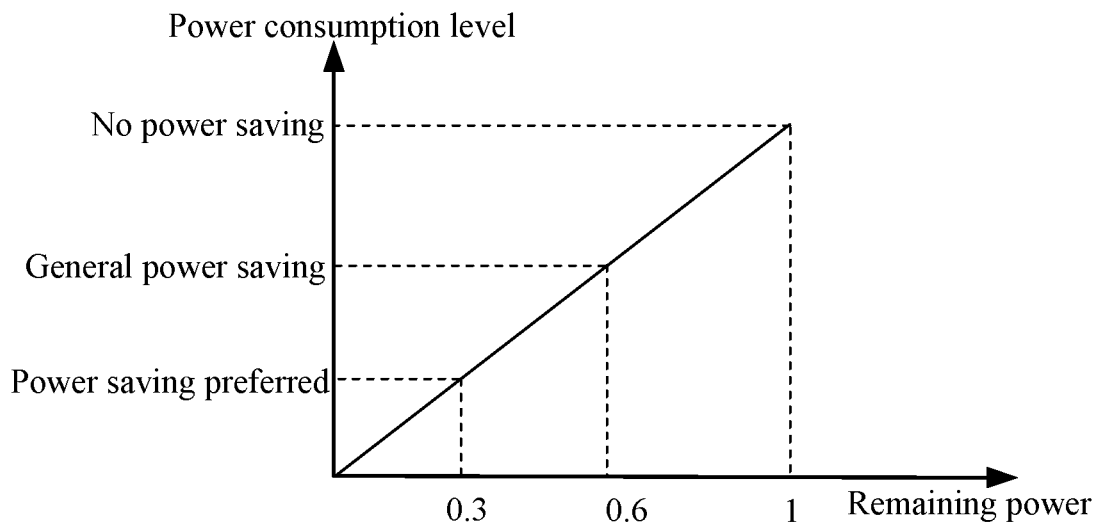
FIG. 2 is a schematic diagram of an example of a terminal power consumption level according to an embodiment of the present invention.

In this embodiment of the present invention, power consumption levels may be classified according to remaining power. Each power consumption level corresponds to a remaining power range, that is, a first threshold at a lower end of the range and a second threshold at an upper end of the range. FIG. 2 is a schematic diagram of an example of a terminal power consumption level according to an embodiment of the present invention. As shown in FIG. 2, remaining power 0-30% corresponds to a power consumption level 3, such as "Power consumption preferred"; remaining power 30%-60% corresponds to a power consumption level 2, that is, "General power saving"; and remaining power 60%-100% corresponds to a power consumption level 1, that is, "No power saving". The threshold values shown in FIG. 2 are only exemplary and shall not be construed as a limitation on this embodiment of the present invention. Other threshold values may be used within the scope of this embodiment of the present invention.

In step 101 shown in FIG. 1, the terminal power consumption level is changed when the remaining power is less than the first threshold or greater than the second threshold. The first threshold is equal to or less than the second threshold. For example, it is assumed that a current terminal power consumption level is 2, the first threshold is 30%, and the second threshold is 60%. When the remaining power drops below 30%, the terminal power consumption level becomes 3; or when the remaining power rises above 60%, the terminal power consumption level becomes 1.

A setting option of a related parameter (such as the first threshold or the second threshold) of the remaining power may be provided in the terminal, so that users can set or adjust a threshold value of the terminal power consumption level based on their requirements; and the terminal receives the users' setting of the first threshold or the second threshold.

The terminal may periodically execute the method for managing a power supply shown in FIG. 1, so as to determine the power consumption level of the terminal in real time.

In this embodiment of the present invention, a power consumption level may also be determined according to terminal settings. For example, the terminal may provide a corresponding setting option of each terminal power consumption level for users to select based on their requirements. The terminal settings may be the users' selection of a terminal power consumption level, and the terminal power consumption level is determined according to the users' selection of the terminal power consumption level. In this case, the remaining power may not be considered, but the terminal power consumption level is specified according only to the users' selection, thereby preferentially meeting the users' requirements. For example, when the users hope that standby time of the terminal is longer, the users may select a terminal power consumption level with least power consumption, without considering the remaining power of the terminal.

In addition, the terminal settings may also associate a terminal power consumption level with an application. In this case, the terminal power consumption level may be determined according to a running status of an application associated with the terminal power consumption level. Some applications (or some functions of an application) may be relatively power-consuming, or it is hoped that running quality is completed within shortest possible time or preferentially ensured without considering power consumption. For example, an application with a large amount of computing, a high-speed download application, or the like is more suitable for running at the terminal power consumption level 1 ("No power saving"). When a terminal at the terminal power consumption level 2 or 3 starts such an application (or starts some functions of the application), the terminal power consumption level may be changed to 1 to adapt to the application; and when such an application is disabled (or some functions of the application are disabled), the terminal power consumption level is changed to a level that is relatively power-saving.

An application may also have an option associated with a terminal power consumption level, so that users may select a power consumption level of the application. When the application is enabled, its terminal power consumption level is set to the selected power consumption level. When the application is disabled, its terminal power consumption level may be restored to the one before the enabling or its terminal power consumption level may be re-determined in another manner according to this embodiment of the present invention.

In this embodiment of the present invention, the remaining power and the terminal settings may also be comprehensively considered to determine an appropriate terminal power consumption level, thereby providing a differentiated power management solution and improving the power supply utilization efficiency of the terminal.

On a basis of maintaining the terminal power consumption level, a related power consumption level on a network side may be further associated to improve the power supply utilization efficiency inside a system.

Figure 3:
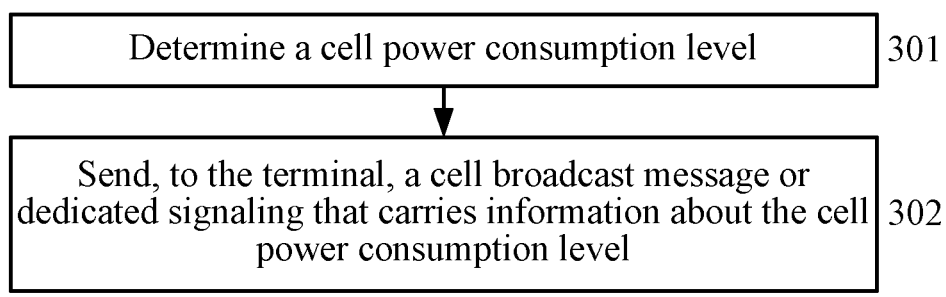
FIG. 3 is a schematic flowchart of a method for managing a power supply according to an embodiment of the present invention.

The foregoing has described examples of setting a power consumption level on a terminal side. In this embodiment of the present invention, a corresponding power consumption level (a cell power consumption level) may also be set on the network side (such as a base station, a base station controller, or the like). FIG. 3 is a schematic flowchart of a method for managing a power supply according to an embodiment of the present invention. The method shown in FIG. 3 is executed by a network-side device (such as a base station, an RNC, or the like).

In step 301, a cell power consumption level is determined, where the cell power consumption level is used to indicate power consumption of a terminal in a cell.

In step 302, a cell broadcast message or dedicated signaling that carries information about the cell power consumption level is sent to the terminal.

In this way, in this embodiment of the present invention, a network side can deliver its own cell power consumption level to a terminal, so that the terminal can perform a matching operation according to the cell power consumption level of the network side, thereby improving the power supply utilization efficiency of a system.

Figure 4:
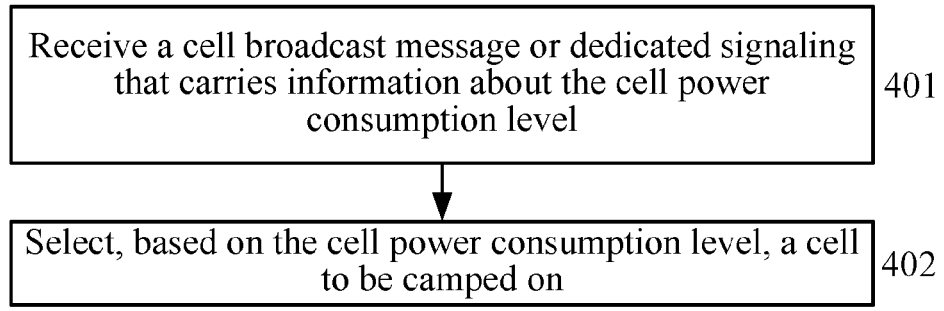
FIG. 4 is a schematic flowchart of a method for managing a power supply according to an embodiment of the present invention.

For example, the terminal can select, according to the cell power consumption level, an appropriate cell to be camped on. FIG. 4 is a schematic flowchart of a method for managing a power supply according to an embodiment of the present invention. The method shown in FIG. 4 may be executed by a terminal device (such as a UE).

In step 401, a cell broadcast message or dedicated signaling that carries information about a cell power consumption level is received, where the cell power consumption level is used to indicate a power consumption level of a terminal in a cell.

In step 402, a cell to be camped on is selected based on the cell power consumption level.

In this way, in this embodiment of the present invention, the terminal can receive the cell power consumption level delivered by a network side, so that the terminal can select, according to the cell power consumption level of the network side, an appropriate cell to be camped on, thereby improving the power supply utilization efficiency of a system.

Figure 5:
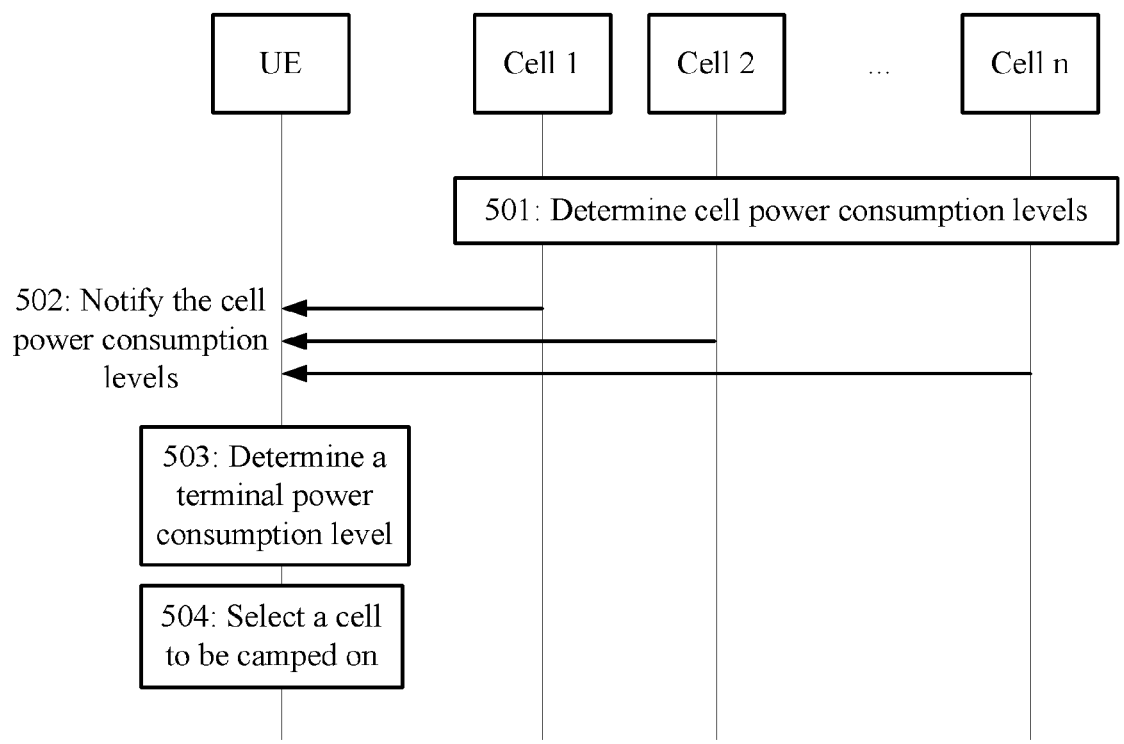
FIG. 5 is a schematic flowchart of a process of selecting a cell to be camped on according to an embodiment of the present invention.

For example, the terminal may select a cell of a cell power consumption level with low power consumption as the cell to be camped on, so as to increase its standby time. In addition, if the terminal is also capable of executing the method shown in FIG. 1, the terminal may select, by comprehensively considering its own terminal power consumption level and cell power consumption levels delivered by cells, a matching cell as the cell to be camped on, thereby ensuring both the standby time and quality of service running FIG. 5 is a schematic flowchart of a process of selecting a cell to be camped on according to an embodiment of the present invention. The process shown in FIG. 5 involves a UE and network-side devices (such as base stations or RNCs; and for simplicity, cells 1–n are used in FIG. 5 to respectively represent their network-side devices) of multiple cells 1, 2, . . ., and n (where n is a positive integer), each of which may serve as a cell to be camped on by the UE.

As shown in FIG. 5, in step 501, network-side devices of the cells 1–n determines their respective cell power consumption levels. The cell power consumption levels may correspond to the foregoing terminal power consumption levels, and for example, include high power consumption, medium power consumption, and low power consumption; or may be different from the foregoing terminal power consumption levels. Each cell may determine its cell power consumption level according to a type of a radio access technology of the cell or a radio parameter that controls the terminal. For example, a 3G cell may have a more power-consuming cell power consumption level than a 2G cell.

In step 502, the network-side devices of the cells notify the UE of their respective cell power consumption levels. Information about a cell power consumption level may be carried using a cell broadcast message or dedicated signaling.

In step 503, the UE maintains its own terminal power consumption level. For example, the UE may determine the terminal power consumption level according to the remaining power or the terminal settings by using the method shown in FIG. 1.

In step 504, after obtaining the cell power consumption levels sent by the network-side devices and its own terminal power consumption level, the UE selects a cell whose cell power consumption level matches the terminal power consumption level as the cell to be camped on.

The UE may preferentially select a cell whose cell power consumption level is equal to or less than the terminal power consumption level as the cell to be camped on. For example, the UE may select, according to the following priorities, the cell to be camped on: preferentially selecting a cell whose cell power consumption level is equal to the terminal power consumption level, then selecting a cell whose power consumption level is less than the terminal power consumption level, and finally selecting a cell whose cell power consumption level is greater than the terminal power consumption level.

In a cell selection or cell reselection process, the UE may select, based on cell power consumption levels broadcasted by several cells in an area to which the UE belongs and its own power consumption level, the cell to be camped on.

It should be noted that although step 503 is displayed as being executed after steps 501 and 502 shown in FIG. 5, this embodiment of the present invention is not limited to this. Step 503 may be executed before step 501 or step 502, or may be executed concurrently with step 501 or step 502. All such changes fall within the scope of this embodiment of the present invention.

After determining its own terminal power consumption level, the UE may also report the terminal power consumption level to the network side, so that the network side can perform a matching operation, thereby improving the power supply utilization efficiency of a system.

Figure 6:
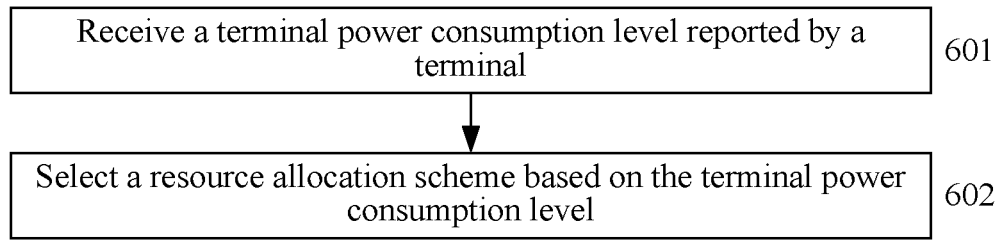
FIG. 6 is a schematic flowchart of a method for managing a power supply according to an embodiment of the present invention.

For example, during resource allocation, the network side may select a resource allocation scheme according to the power consumption level reported by the terminal. FIG. 6 is a schematic flowchart of a method for managing a power supply according to an embodiment of the present invention. The method shown in FIG. 6 is executed by a network-side device (such as a base station, an RNC, or the like).

In step 601, a terminal power consumption level reported by a terminal is received, where the terminal power consumption level is one of at least two power consumption levels of the terminal.

In step 602, a resource allocation scheme is selected based on the terminal power consumption level.

In this way, in this embodiment of the present invention, a network-side device receives the terminal power consumption level of the terminal and selects the appropriate resource allocation scheme based on the terminal power consumption level, thereby improving the power supply utilization efficiency of a system.

For example, the network side may preferentially select a radio parameter, a channel configuration, a feature configuration, or another parameter that matches the terminal power consumption level.

Figure 7:
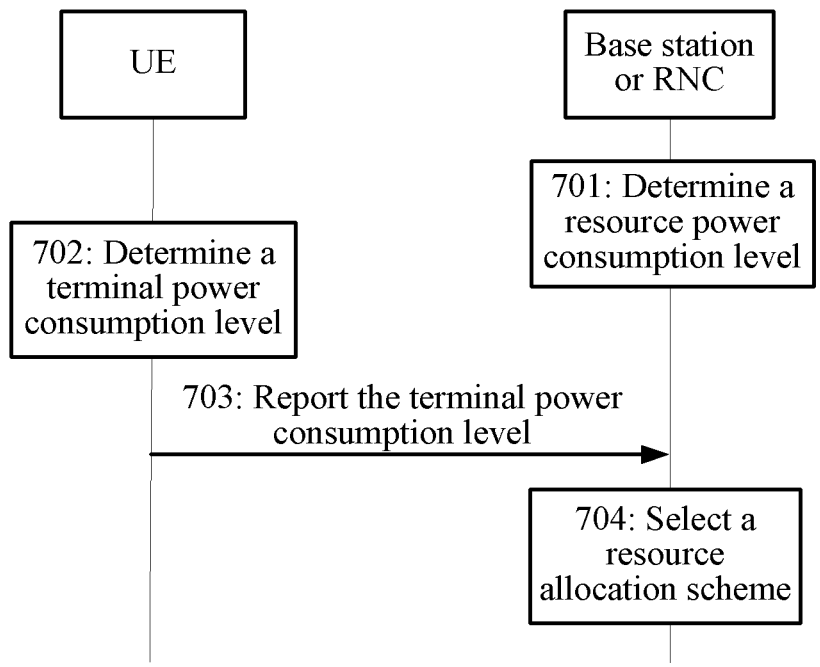
FIG. 7 is a schematic flowchart of a process of resource allocation scheme according to an embodiment of the present invention.

When selecting the resource allocation scheme according to the power consumption level reported by the terminal, the network side may also comprehensively consider a resource power consumption level that corresponds to each resource allocation scheme. FIG. 7 is a schematic flowchart of a process of selecting a resource allocation scheme according to an embodiment of the present invention. The process shown in FIG. 7 involves a terminal UE and a network-side device (a base station or an RNC) of a cell.

As shown in FIG. 7, in step 701, the cell determines a resource power consumption level of each resource allocation scheme. The resource power consumption levels may correspond to the foregoing terminal power consumption levels, and for example, include high power consumption, medium power consumption, and low power consumption; or may be different from the foregoing terminal power consumption levels. The cell determines power consumption levels of the resource allocation schemes according to power consumption requirements of the resource allocation schemes. For example, for a voice service, a 12.2 kbps rate scheme has a more power-consuming resource power consumption level than a 4.75 kbps rate scheme.

In step 702, the UE maintains its own terminal power consumption level. For example, the UE may determine the terminal power consumption level according to the remaining power or the terminal settings by using the method shown in FIG. 1.

In step 703, the UE reports the terminal power consumption level to a network side.

In step 704, when allocating a radio resource to the terminal, the network side selects a resource allocation scheme whose resource power consumption level matches the UE power consumption level.

For example, the network side may preferentially select a resource allocation scheme whose resource power consumption level is equal to or less than the terminal power consumption level. For example, the network side may select, according to the following priorities, a resource allocation scheme: preferentially selecting a resource allocation scheme whose resource power consumption level is equal to the terminal power consumption level, then selecting a resource allocation scheme whose resource power consumption level is less than the terminal power consumption level, and finally selecting a resource allocation scheme whose resource power consumption level is greater than the terminal power consumption level.

It should be noted that although step 701 is displayed as being executed before steps 702 and 703 shown in FIG. 7, this embodiment of the present invention is not limited to this. Step 701 may be executed after step 702 or step 703, or may be executed concurrently with step 702 or step 703. All such changes fall within the scope of this embodiment of the present invention.

The following describes a specific application example of this embodiment of the present invention in combination with the examples shown in FIG. 2, FIG. 5, and FIG. 7. It should be noted that this example is only intended to better express the concepts of this embodiment of the present invention other than limiting the scope of this embodiment of the present invention.

If remaining power of a terminal is less than 30% and a terminal power consumption level is the level 3 ("Power saving preferred"), only a 4.75 kbps low-rate voice service is established for the terminal in connected state during radio resource allocation; and a UE in idle state preferentially selects to camp on a 2G network. If the remaining power exceeds 60%, the terminal power consumption level is 1 and a voice service of 12.2 kbps or an even higher rate is preferentially established for the terminal; and the UE in the idle state may camp on a 3G network (the 2G network is more power-saving than the 3G network).

Figure 8:
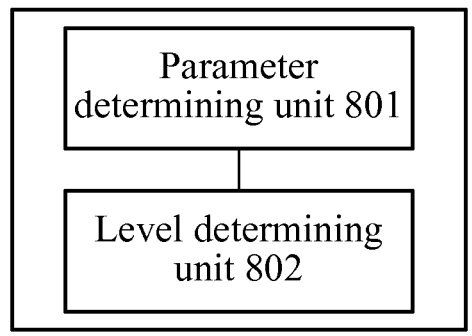
FIG. 8 is a schematic block diagram of a terminal device according to an embodiment of the present invention.

FIG. 8 is a schematic block diagram of a terminal device according to an embodiment of the present invention. As shown in FIG. 8, the terminal device includes a parameter determining unit 801 and a level determining unit 802, where:

the parameter determining unit 801 is configured to determine remaining power or terminal settings; and the level determining unit 802 is configured to determine a terminal power consumption level according to the remaining power or terminal settings, where the terminal power consumption level is one of at least two power consumption levels.

Therefore, in this embodiment of the present invention, different power consumption levels are applied according to different remaining power of a terminal power supply or terminal settings, thereby adapting to differentiated power consumption requirements and improving the power supply utilization efficiency of the terminal.

An example of the terminal device shown in FIG. 8 is a UE, which is capable of executing each process shown in FIG. 1.

Figure 9:
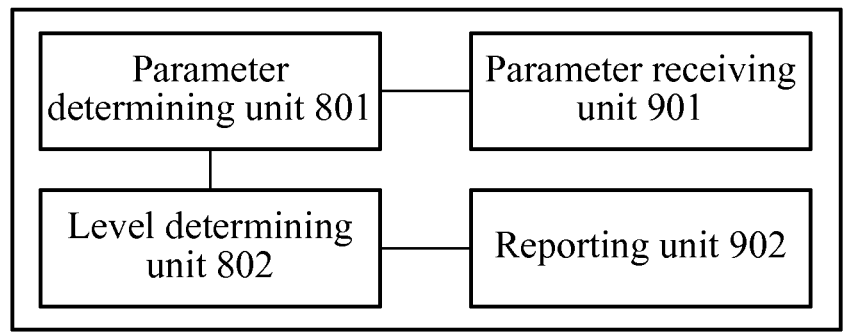
FIG. 9 is a schematic block diagram of a terminal device according to another embodiment of the present invention.

FIG. 9 is a schematic block diagram of a terminal device according to another embodiment of the present invention. In FIG. 9, parts that are the same as or similar to those in FIG. 8 are expressed by using same drawing marks, and a detailed description of them is appropriately omitted.

The level determining unit 802 shown in FIG. 9 may change a terminal power consumption level when remaining power is less than a first threshold or greater than a second threshold. The terminal device shown in FIG. 9 includes an optional parameter receiving unit 901, configured to receive a parameter setting of the first threshold or the second threshold.

Alternatively, the level determining unit 802 determines the terminal power consumption level according to users' selection of the terminal power consumption level, or determines the terminal power consumption level according to a running status of an application associated with the terminal power consumption level. In this case, the terminal may have a corresponding option of each terminal power consumption level for the users to select or set, and the parameter receiving unit 901 receives the users' selection of the terminal power consumption level.

In addition, the terminal may provide an option for a terminal power consumption level of each application for the users to select or set, and the parameter receiving unit 901 receives the users' corresponding settings of the applications.

In addition, the terminal device shown in FIG. 9 may further include a reporting unit 902, configured to report the terminal power consumption level to a network side, so that, for example, the network side can select an appropriate resource allocation scheme according to the reported terminal power consumption level.

An example of the terminal device shown in FIG. 9 is a UE, which is capable of executing each process involving the terminal UE in FIG. 5 and FIG. 7.

Figure 10:
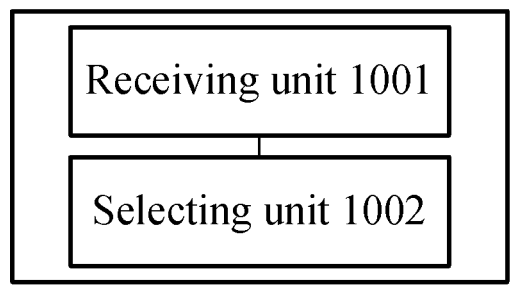
FIG. 10 is a schematic block diagram of a terminal device according to another embodiment of the present invention.

FIG. 10 is a schematic block diagram of a terminal device according to another embodiment of the present invention. The terminal device shown in FIG. 10 includes a receiving unit 1001 and a selecting unit 1002.

The receiving unit 1001 is configured to receive a cell broadcast message or dedicated signaling that carries information about a cell power consumption level, where the cell power consumption level is used to indicate a power consumption level of the terminal in a cell; and the selecting unit 1002 is configured to select, based on the cell power consumption level, a cell to be camped on.

In this way, in this embodiment of the present invention, the terminal can receive the cell power consumption level delivered by a network side, so that the terminal can select, according to the cell power consumption level of the network side, an appropriate cell to be camped on, thereby improving the power supply utilization efficiency of a system.

An example of the terminal device shown in FIG. 10 is a UE, which is capable of executing each process shown in FIG. 4.

Figure 11:
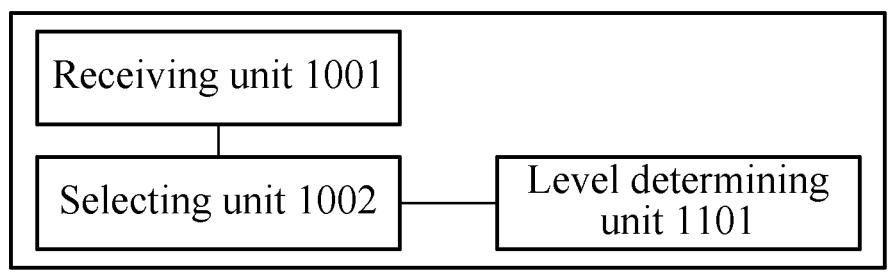
FIG. 11 is a schematic block diagram of a terminal device according to another embodiment of the present invention.

FIG. 11 is a schematic block diagram of a terminal device according to another embodiment of the present invention. In FIG. 11, parts that are the same as or similar to those in FIG. 10 are expressed by using same drawing marks, and a detailed description of them is appropriately omitted.

The terminal device shown in FIG. 11 further includes a level determining unit 1101, in addition to the parts shown in FIG. 10. Similar to the level determining unit 802 shown in FIG. 8, a level determining unit 1101 is configured to determine a terminal power consumption level according to remaining power or terminal settings, where the terminal power consumption level is one of at least two power consumption levels.

In this case, the selecting unit 1002 selects a cell whose cell power consumption level matches the terminal power consumption level as the cell to be camped on.

Figure 12:
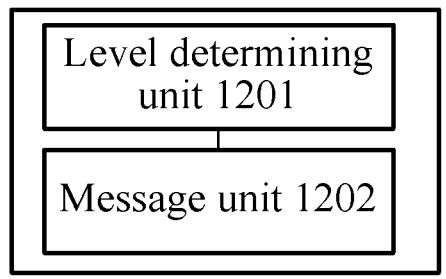
FIG. 12 is a schematic block diagram of a network-side device according to an embodiment of the present invention.

The following describes corresponding network-side devices. FIG. 12 is a schematic block diagram of a network-side device according to an embodiment of the present invention. The network-side device shown in FIG. 12 includes a level determining unit 1201 and a message unit 1202.

The level determining unit 1201 is configured to determine a cell power consumption level, where the cell power consumption level is used to indicate power consumption of a terminal in a cell; and the message unit 1202 is configured to send, to the terminal, a cell broadcast message or dedicated signaling that carries information about the cell power consumption level.

In this way, in this embodiment of the present invention, a network side can deliver its own cell power consumption level to the terminal, so that the terminal can perform a matching operation according to the cell power consumption level of the network side, thereby improving the power supply utilization efficiency of a system.

An example of the network-side device shown in FIG. 12 is a base station or an RNC, which is capable of executing each process shown in FIG. 3.

For example, the level determining unit 1201 may determine the cell power consumption level according to a type of a radio access technology of the cell or a radio parameter that controls the terminal.

Figure 13:
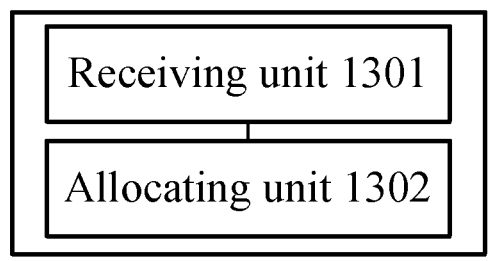
FIG. 13 is a schematic block diagram of a network-side device according to another embodiment of the present invention.

FIG. 13 is a schematic block diagram of a network-side device according to another embodiment of the present invention. The network-side device shown in FIG. 13 includes a receiving unit 1301 and an allocating unit 1302, where:

the receiving unit 1301 is configured to receive a terminal power consumption level reported by a terminal, where the terminal power consumption level is one of at least two power consumption levels of the terminal; and the allocating unit 1302 is configured to select a resource allocation scheme based on a resource power consumption level and the terminal power consumption level.

In this way, in this embodiment of the present invention, a network-side device receives the terminal power consumption level of the terminal and selects the appropriate resource allocation scheme based on the terminal power consumption level, thereby improving the power supply utilization efficiency of a system.

An example of the network-side device shown in FIG. 13 is a base station or an RNC, which is capable of executing each process shown in FIG. 6.

Figure 14:
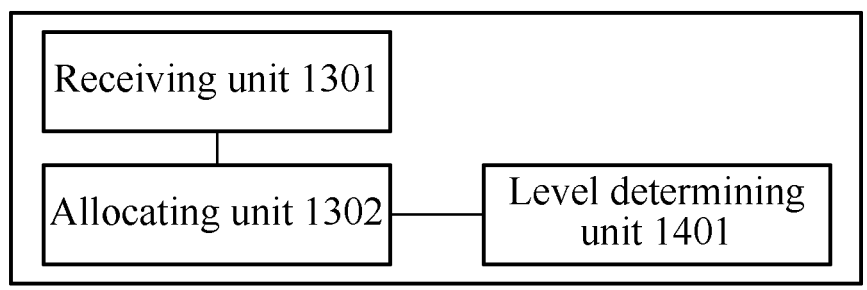
FIG. 14 is a schematic block diagram of a network-side device according to another embodiment of the present invention.

FIG. 14 is a schematic block diagram of a network-side device according to another embodiment of the present invention. In FIG. 14, parts that are the same as or similar to those in FIG. 13 are expressed by using same drawing marks, and a detailed description of them is appropriately omitted.

The network-side device shown in FIG. 14 further includes a level determining unit 1401, in addition to the parts shown in FIG. 13. The level determining unit 1401 is configured to determine a resource power consumption level, where the resource power consumption level is used to indicate power consumption of a resource allocation scheme.

In this case, the allocating unit 1302 selects a resource allocation scheme whose resource power consumption level matches a terminal power consumption level.

For example, the allocating unit 1302 may select, according to the following priorities, a resource allocation scheme: preferentially selecting a resource allocation scheme whose resource power consumption level is equal to the terminal power consumption level, then selecting a resource allocation scheme whose resource power consumption level is less than the terminal power consumption level, and finally selecting a resource allocation scheme whose resource power consumption level is greater than the terminal power consumption level.

A communications system according to an embodiment of the present invention includes the foregoing terminal devices or network-side devices.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing a power supply, comprising:
   receiving a cell broadcast message or dedicated signaling that carries information about a cell power consumption level, wherein the cell power consumption level indicates a power consumption level of a cell to a terminal;
   determining a terminal power consumption level according to remaining power or terminal settings, and
   selecting a cell whose cell power consumption level matches the terminal power consumption level as a cell to be camped on.

2. The method according to claim 1, wherein the selecting a cell whose cell power consumption level matches the terminal power consumption level as the cell to be camped on comprises:
   preferentially selecting a cell whose cell power consumption level is equal to or less than the terminal power consumption level as the cell to be camped on.

3. A method for managing a power supply, comprising:
   receiving a terminal power consumption level reported by a terminal, wherein the terminal power consumption level is one of at least two power consumption levels of the terminal;
   determining a resource power consumption level, and a resource power consumption level is used to indicate power consumption of a resource allocation scheme; and
   selecting a resource allocation scheme whose resource power consumption level matches the terminal power consumption level.

4. The method according to claim 3, wherein the selecting a resource allocation scheme further comprises:

preferentially selecting a radio parameter, a channel configuration, or a feature configuration that matches the terminal power consumption level.

5. The method according to claim 3, wherein the selecting a resource allocation scheme whose resource power consumption level matches the terminal power consumption level comprises: preferentially selecting a resource allocation scheme whose resource power consumption level is equal to or less than the terminal power consumption level.

6. A non-transitory computer-readable medium storing computer executable instructions that when executed by a processor instruct the processor to:
- receive a cell broadcast message or dedicated signaling that carries information about a cell power consumption level, wherein the cell power consumption level indicates a power consumption level of a cell to a terminal;
- determine a terminal power consumption level according to remaining power or terminal settings, and
- select a cell whose cell power consumption level matches the terminal power consumption level as a cell to be camped on.

7. The non-transitory computer readable medium according to claim 6, wherein the select a cell whose cell power consumption level matches the terminal power consumption level as the cell to be camped on comprises:
- select a cell whose cell power consumption level is equal to or less than the terminal power consumption level as the cell to be camped on.

* * * * *